United States Patent [19]

Minamisawa et al.

[11] Patent Number: 5,210,570
[45] Date of Patent: May 11, 1993

[54] METHOD FOR DETERMINING AN EXPOSURE FOR PRINTING

[75] Inventors: Kiyoshi Minamisawa; Akemi Kosugi; Yasuaki Satoh; Yoshiaki Yamanaka, all of Hino, Japan

[73] Assignee: Konica Corporation, Tokyo, Japan

[21] Appl. No.: 881,399

[22] Filed: May 11, 1992

[30] Foreign Application Priority Data

May 21, 1991 [JP] Japan .................. 3-145536

[51] Int. Cl.$^5$ .............................. G03B 27/80
[52] U.S. Cl. .......................... 355/38; 355/77
[58] Field of Search .......... 355/32, 35, 38, 68, 355/77; 356/404, 444

[56] References Cited

U.S. PATENT DOCUMENTS

| | | | |
|---|---|---|---|
| 3,888,580 | 6/1975 | Amano et al. | 355/38 |
| 4,092,067 | 5/1978 | Grossmann | 355/77 |
| 4,168,120 | 9/1979 | Freier et al. | 355/38 |
| 4,339,517 | 7/1982 | Akimoto | 355/38 |
| 4,641,959 | 2/1987 | Terashita | 355/77 |
| 4,668,082 | 5/1987 | Terashita et al. | 355/77 |
| 5,019,858 | 4/1991 | Suzuki | 355/35 |

FOREIGN PATENT DOCUMENTS

| | | |
|---|---|---|
| 56-2691 | 1/1981 | Japan . |
| 63-52367 | 10/1988 | Japan . |
| 1-195439 | 8/1989 | Japan . |
| 3-19533 | 3/1991 | Japan . |

*Primary Examiner*—Michael L. Gellner
*Assistant Examiner*—D. Rutledge
*Attorney, Agent, or Firm*—Frishauf, Holtz, Goodman & Woodward

[57] ABSTRACT

A method for determining an exposure for printing an original image of a photographic film onto a photographic paper. The method includes the steps of; scanning an image on a photographic film to obtain an image data; obtaining plural region characteristic values which includes a maximum density value, a minimum density value, and an average density value in each of plural areas of an image for example; obtaining plural image characteristic values from the region characteristic values; calculating a linear first order sum of the image characteristic values; and selecting one of plural predetermined sets according to the result of the calculating step. The exposure is determined with the regression equation predetermined for one of the predetermined sets.

3 Claims, 10 Drawing Sheets

METHOD FOR DETERMINING AN EXPOSURE FOR PRINTING

BACKGROUND OF THE INVENTION

The present invention relates to a method for determining an exposure which is used in the process of photographic printing, and more particularly relates to a method for determining an exposure by which an appropriate exposure or exposure correction can be determined for the purpose of exposing a photosensitive material such as a photographic paper on the basis of image data obtained when an original image formed on a photographic film is scanned.

When an ordinary photograph is taken, it has been experimentally known that the average reflectances of three primary colors including blue (B), green (G) and red (R), which will be referred to as B, G and R hereinafter, are approximately constant. Accordingly, in a conventional photographic printing apparatus, photographic prints of balanced density and color are obtained in this manner: large area transmission density (LATD) with regard to the entire area of an original image is measured; an exposure is determined according to the measured LATD so that an exposure given to each photosensitive layer including B, G and R provided on a photographic paper can be controlled to be constant.

The aforementioned method is disadvantageous in that an appropriate photographic print can not be provided when a luminance distribution or color distribution of a photographic object is biased. An original photographic image, the luminance or color distribution of which is biased, is referred to as a subject failure, when the luminance distribution of a photographic object is biased, the original photographic image is referred to as a density failure, and when the color distribution is biased, the original photographic image is referred to as a color failure. It has been experimentally known that about 65% of original images can be satisfactorily finished in an actual photographing process conducted by the method of LATD.

The following technique disclosed in the official gazette of Japanese Patent Publication No. 2691/1981 is well known for the purpose of automatically adjusting an exposure with regard to a density failure. According to the technique, first, an original image formed on a negative photographic film is scanned; region characteristic values of each image region, that is, the maximum density, minimum density and average density of each image region are found from an image density obtained in the aforementioned scanning operation; the original image is classified according to the obtained characteristic values; and an exposure for the original image is adjusted according to a function of the characteristic value which has been previously determined with regard to each classification. According to the aforementioned technique, the image is divided into several regions in such a manner that the screen of an original image is divided into an upper and a lower portion, a right and a left portion, and a center and a peripheral portion.

Specifically, original images are classified in this manner: the densities of the upper, lower, right, left and central portion are compared with each other, and the original images are classified into two groups, one is a group of original images, the density difference of which is small, and the other is a group of original images, the density difference of which is large. An original image, the density difference of which is small, corresponds to an original image in which open flat scene, the sea or snow, for example, is photographed. An original image, the density difference of which is large and the density of the center is higher than that of the peripheral portion, corresponds to an original image of strobe in dark. In the case of an original image, the contrast of the peripheral portion of which is high, it is classified into lateral camera angle and longitudinal camera angle when the density difference is compared between the upper and the lower portion, and the right and the left portion. When the density difference between the right and left portion is large as compared with that between the upper and lower portion, it can be judged that the picture has been taken in the longitudinal position.

In the case of general photography in which a picture is taken in a normal position, the sky is taken in the upper portion of a screen, and the ground is taken in the lower portion of the screen, and further, illuminating light is supplied from the sky. If the density of upper position in higher than that of lower position in negative film, the low exposure is proper because the outdoor scene is taken under blue sky.

However, there are various photographing conditions which will be described as follows:

The inserting direction of a negative film is not constant in a printing process, so that the film position sometimes becomes upside-down; in some cameras, the direction of film loading is reverse; and even when the same original image is utilized, the inserting direction of a negative film differs according to the size of a photographic printing paper.

For that reason, in some cases, original images can not be classified correctly, and an appropriate exposure or exposure correction can not be provided.

In order to provide an appropriate exposure or exposure correction not depending on the condition of an original image, that is, the image is normal or inverse, the following technique is disclosed in the Japanese Patent Application Open to Public Inspection No. 195439/1989:

First, an original image on a photographic film is scanned. Then, two-dimensional image data is found from the image density obtained through the scanning operation. According to the aforementioned image data, datum of each pixel is sorted and arranged. After that, region characteristic values of each region on the image are found on the basis of the arranged two-dimensional image data. According to the region characteristic values, the original image is classified. Then, the exposure for the original image is adjusted with a function which has been previously determined with regard to each class.

In the aforementioned case, the following procedure is shown as a method for sorting and arranging information of each pixel:

On the basis of the obtained two-dimensional image data, a total or average of the image data is found with regard to the row or line direction. According to the result of the aforementioned calculation, the entire pixel values of the row or line are arranged in the order of increasing power or decreasing power. After the aforementioned sorting and arranging operation has been performed, the two-dimensional image data representing the image structure is lost. However, density data can be uniformly treated irrespective of the condition of the image, that is, the image is normal or inverse, or irrespective of the camera angle. Consequently, an appropriate exposure or exposure correction can be provided in accordance with the condition of the original image.

On the other hand, the following method is disclosed in the official gazettes of Japanese Patent Publication Nos. 52367/1988 and 19533/1991.

In the official gazette of Japanese Patent Publication No. 52367/1988, the following method is disclosed: Consideration is given to the matter that the same scene is continuously photographed in the same printing order in many cases. Similarity between the present frame and the previous frame is judged on the basis of the image characteristic values. The exposure of the frame which has been judged similar, and the temporary exposure of the present frame are averaged so that the final exposure of the present frame can be determined.

In the official gazette of Japanese Patent Publication No. 19533/1991, the following method is disclosed: In order to calculate the exposure of the present frame to be printed, similarity between a plurality of frames and the present frame is found, and the temporary exposure of the present frame is weighted in accordance with the similarity, or the temporary exposure of the present frame is weighted in accordance with the relation between the recording position of the present frame and that of the plurality of frames.

In both cases mentioned above, consideration is given to the continuity of quality of finished prints in the same printing order.

According to the aforementioned exposure determining method disclosed publicly, an exposure or exposure correction is determined as follows:

Characteristic values are calculated from two-dimensional image data obtained when an original image is scanned. According to the obtained characteristic values, the original image is classified into one of a plurality of predetermined sets. An exposure correcting function which has been previously stored correspondingly to each set, is applied to the original image so that the exposure or the exposure correction is determined.

In the aforementioned example, original images are classified as follows:

The original images are classified into a plurality of sets in accordance with the average density of the entire original image. The original images are classified into a plurality of sets in accordance with the contrast between the primary photographic object (the center of the original image) and the background (the peripheral portion of the original image). Results of the aforementioned classifications are combined so that further classification is performed.

According to the aforementioned methods, the threshold values of classification are determined with a statistic method on the basis of the characteristic values of a large number of original images (referred to as a population, hereinafter). For example, in the case where original images are classified into a plurality of sets in accordance with the contrast between a primary photographic object and a background, the density difference between the center and the peripheral portion of each original image is calculated, and a plurality of classification threshold values are determined on the basis of the calculated density difference so that the threshold values can be appropriate with regard to the population.

In general, in one printing order of a negative film, the same scene is photographed in the negative film. Although the same scene is photographed in one negative film, its photographing conditions are slightly different in many cases, for example, the camera angle is different, the size of a primary photographic object is different, the position of the photographic object in the screen is different, and the photographing exposure is different. Consequently, there is a possibility that the region characteristic values obtained from these original images such as the maximum density, minimum density and average density of each divided region, are different. In the case of the aforementioned classification method in which consideration is given to particular region characteristic values (the density difference between the center and the peripheral portion of each original image), and in which the original images are classified into a plurality of sets according to the characteristic values or the results of comparison between the region characteristic values and the reference value, the sets classified depend only upon the characteristic value, so that there is a tendency that the original images are classified into different sets although the scenes on the original images are similar. Accordingly, a different exposure or exposure correction is required to be calculated.

As a further example, in the case in which original images are classified into a plurality of sets in accordance with the average density of the entire original image, there is a high possibility that a plurality of original images in which the same scene has been photographed a plurality of times with slightly different photographic exposures, are classified into different sets. Consequently, it is not possible to continuously and stably obtain an exposure or exposure correction in the same printing order.

To keep up a good standard of photographic printing in laboratories, they attach importance to the stability and continuity of density and color balance of the photographic prints in the same printing order. When photographic prints in the same printing order lack continuity and stability, it is necessary to reprint them, and if this occurs frequently, it lowers the productivity of the laboratory and increases the cost of photographic prints. Therefore, it has been desired to overcome the disadvantages which occur in the aforementioned conventional technique.

According to the aforementioned Japanese Patent Publication Nos. 52367/1988 and 19533/1991, a method is disclosed to calculate a similar exposure or a similar exposure correction in the case of a similar scene.

The aforementioned method is disadvantageous in that: When the similarity is not judged correctly, not only an appropriate exposure can not be calculated for the present frame, but also the exposure of a plurality of frames which have been misjudged to be similar, is affected.

According to the latter method, the continuity of print quality can be a little improved in one printing order. However, in this case, it is necessary to determine a temporary exposure for a series of frames before an exposure for the present frame is determined, and further it is necessary to calculate the similarity of the present frame with regard to other frames. Accordingly, the calculation becomes complicated, and it takes a long period of time, and further the processing capability of the photographic printing apparatus is lowered.

The present invention has been achieved in order to solve the aforementioned problems in the prior art. It is a primary object of the present invention to provide a method for determining an exposure that: specific image characteristic values are taken up, and the values are compared with each other or they are compared with a predetermined reference value; according to the result of the comparison, the fluctuation of an exposure or an exposure correction caused when the original images are classified into a plurality of image sets, is absorbed; and photographic prints of constant quality can be effectively produced without depending on the photographing exposure and the position of a primary photographic object.

SUMMARY OF THE INVENTION

In order to attain the aforementioned object, a method for determining an exposure of the present invention comprises the steps of: an original image on a photographic film is scanned to obtain image data; the region characteristic values, which include a maximum density value, a minimum density value, and an average density value in each of plural areas of an original image, are obtained; the image characteristic values are obtained from the region characteristic values; the linear first order sums of the image characteristic values are calculated; according to the result of the calculating step, a set to which the original image belongs is determined, wherein the set is one of a predetermined plurality of sets; and an exposure or exposure correction for the original image is calculated with a predetermined regression equation in accordance with the judged set.

According to the method for determining an exposure of the present invention, the characteristic values for use in image classification and the characteristic values for use in exposure calculation are calculated using the image data. The former is calculated for classifying the original images into a plurality of sets, and the latter is calculated for determining an exposure of a given original image, wherein the function of the aforementioned image data or the image data themselves are utilized for the calculation.

As a first process to classify the original image, linear first order sums obtained when the characteristic values for use in image classification are multiplied by a weighting factor, are calculated. Then, the result of the calculation is compared with each set, and a set to which the original image belongs is judged.

According to the present invention, the linear first order sum is calculated in the aforementioned manner, so that the image can be evaluated overall with a plurality of characteristic values for use in image classification. Therefore, the features which do not depend on photographing conditions such as a photographing exposure and the position of a primary photographic object, can be evaluated accurately. Consequently, the accuracy of classification is high according to this method as compared with a method in which consideration is given only to specific image characteristic values. For that reason, scenes which are similar to each other can be positively classified into the same set.

A large number of original image populations are statistically analyzed when the aforementioned characteristic values for use in image classification are selected and the weighting factor is calculated. Therefore, images can be classified using more common and reliable image characteristic values.

According to the present invention, a calculation to judge the classification is performed in the form of linear first order sums, and a calculation to calculate an exposure or exposure correction is performed, using a regression equation which has been determined in accordance with each image set. Consequently, photographic prints in high quality can be correctly and quickly obtained with a simple calculation.

DETAILED DESCRIPTION OF THE INVENTION

Referring now to the attached drawings, an example of the method for determining an exposure according to the present invention will be explained as follows.

Figure 1:
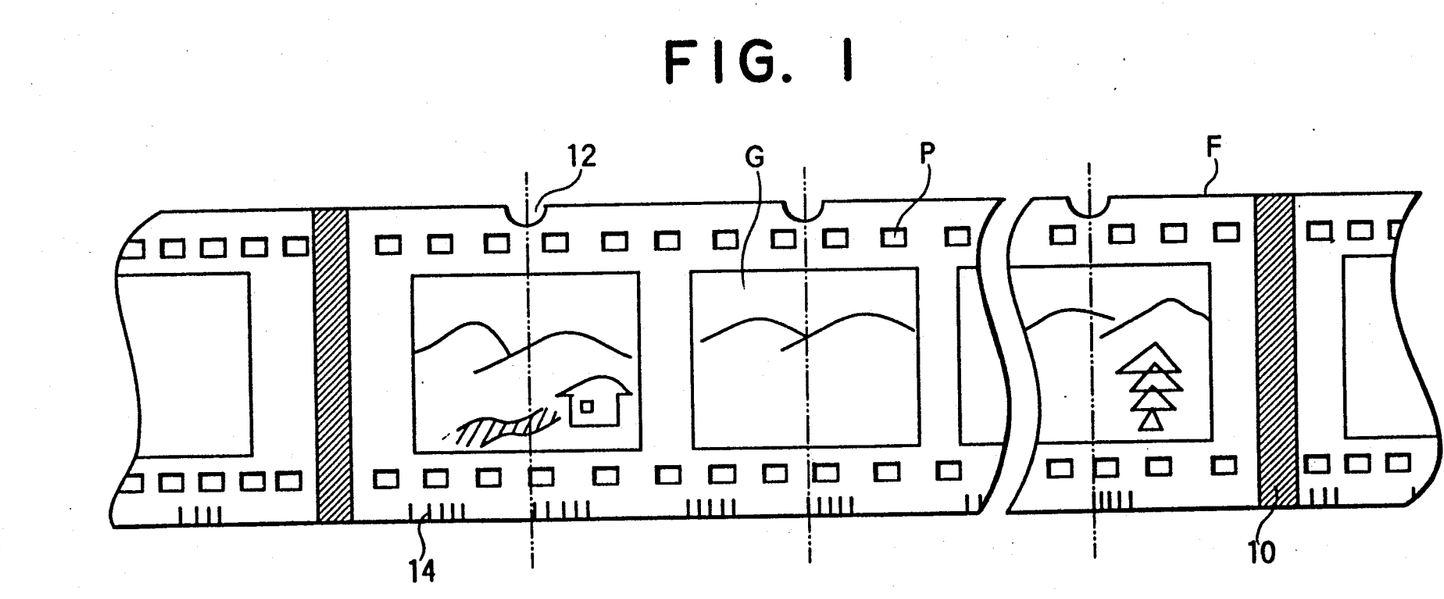
FIG. 1 is a schematic illustration showing the structure of a 135 photographic film which is used to explain the method for determining an exposure of the present invention.

FIG. 1 is a schematic illustration showing the structure of a 135 photographic film which has been subjected to printing processing.

In FIG. 1, developed images G are formed on photographic film F. A plurality of photographic films F are connected by a splice 10 so that they are formed into a roll-shape. In a notch process provided before a photographic printing process, notches 12 indicating the center of a frame are formed on the side of roll-shaped photographic film F. Conventional perforations P are previously formed on both sides of roll-shaped photographic film F. In a process after this notch 12 has been detected, position control of photographic film F is performed. As shown in FIG. 1, a bar code 14 indicating the kind of film is attached onto photographic film F. It should be understood that photographic film F in this example is not limited to a 135 photographic film, but other types of film may be utilized.

Roll-shaped photographic film F processed in the manner mentioned above, is subjected to printing processing in a photographic printing apparatus.

Figure 2:
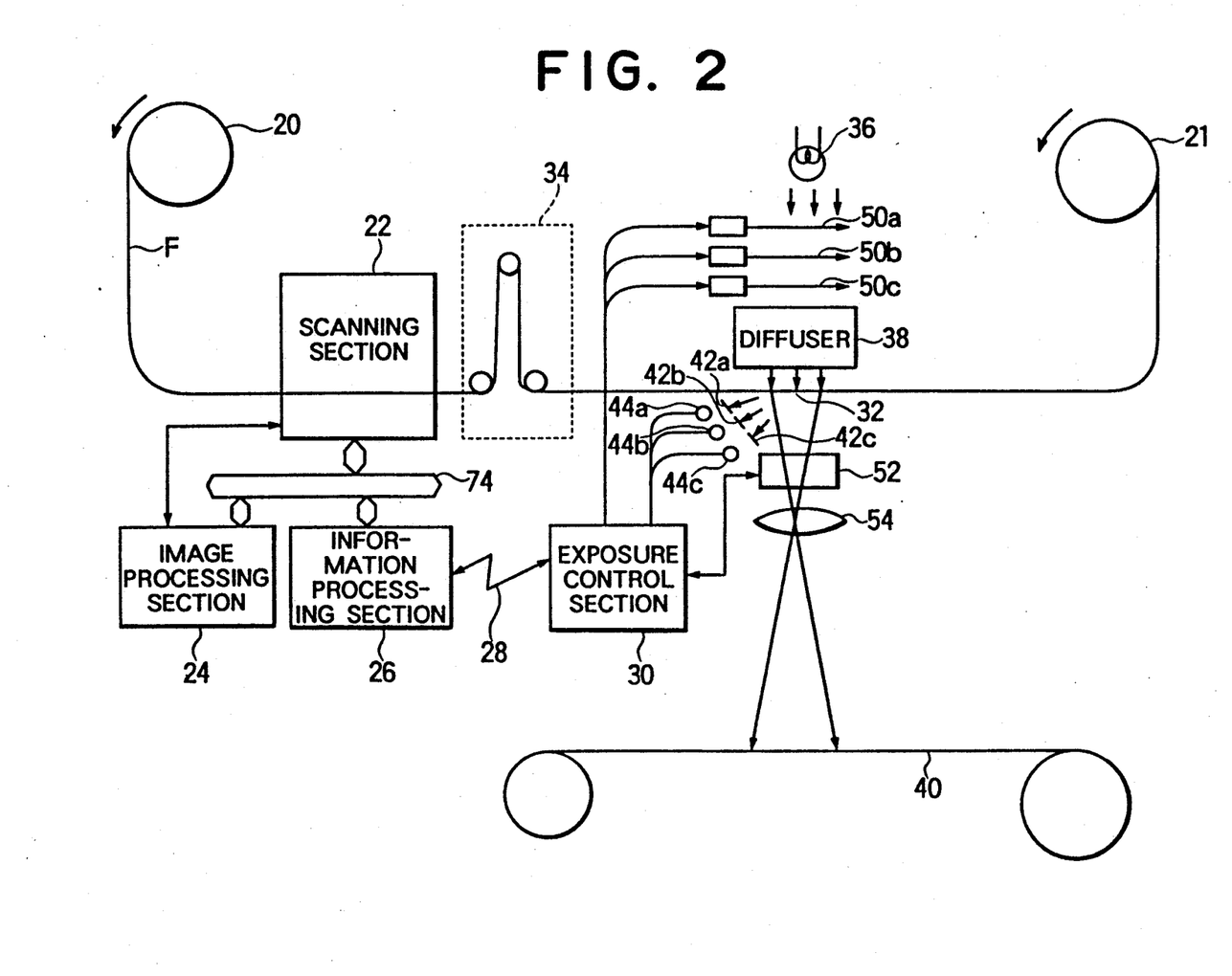
FIG. 2 is a schematic illustration showing the structure of a photographic printing apparatus to which the method for determining an exposure of the present invention is applied.

FIG. 2 shows the structure of the photographic printing apparatus.

Photographic film F is set around a spool 20, and wound around a spool 21 through a predetermined conveyance passage. In the middle of the conveyance passage, a scanning section 22 is provided, and an original image recorded on photographic film F is scanned, being color-separated into B, G and R. Image signals of B, G and R obtained in the scanning section 22 are sent to an information processing section 24 and A/D-converted so that the signals are formed into a predetermined type of image density data. Then, the image density data is sent to an information processing section 26.

The image density data is processed in the information processing section 26 in the manner described later. As a result, a correction with regard to each original image is calculated, and the signal of this correction is transmitted to an exposure control section 30 through a transmission line 28. Photographic film F which has passed through the scanning section 22, is sent to an exposure section 32 through a buffer section 34 which is provided between the scanning section 22 and the exposure section 32 so that the speed difference between the scanning section 22 and the exposure section 32 can be absorbed and further a plurality of original images can be previously scanned before exposure. The length of the conveyance passage between the scanning section 22 and the exposure section 32 corresponds to that of a 135 photographic film of 24 frames maximum. Due to the foregoing, almost all information of original images G recorded on a roll of 135 photographic film F can be obtained before the photographic film is exposed.

Each original image formed on photographic film F is positioned on the exposure section 32. Light emitted from a light source 36 is unified by a diffusing section 38 and illuminates the original image. Then, the image is optically formed on a photographic paper 40 by a lens 54.

In this case, average transmitted light of B, G and R of the original image pass through photometry filters 42a, 42b and 42c of B, G and R, and are then received by photodiodes 44a, 44b and 44c. Photometry signals of B, G and R which are obtained when the amount of received light is photoelectrically transferred, are supplied to an exposure control section 30 and A/D converted. After that, the exposure is calculated according to the data obtained as a result of the aforementioned processing and the exposure correction supplied from an information processing section 26.

The exposure obtained here is converted by the exposure control section 30 into the operation time of subtractive color type of cut filters 50a, 50b, 50c of substractive color, yellow (Y), magenta (M) and cyan (C), and also converted into the operation time of a shutter 52 disposed under the exposure section 32. In accordance with the aforementioned operation time, the cut filters 50a, 50b, 50c and the shutter 52 are inserted into the exposure optical path so that the exposure of each photosensitive layer on a photographic paper 40 can be adjusted. After the aforementioned exposure operation has been completed, the photographic paper 40 is conveyed by a predetermined distance, preparing for the next exposure operation, and at the same time, photographic film F is conveyed so that original image G to be printed next, can be positioned in the exposure section 32.

In the manner mentioned above, original images G formed on photographic film F are successively printed.

Figure 3:
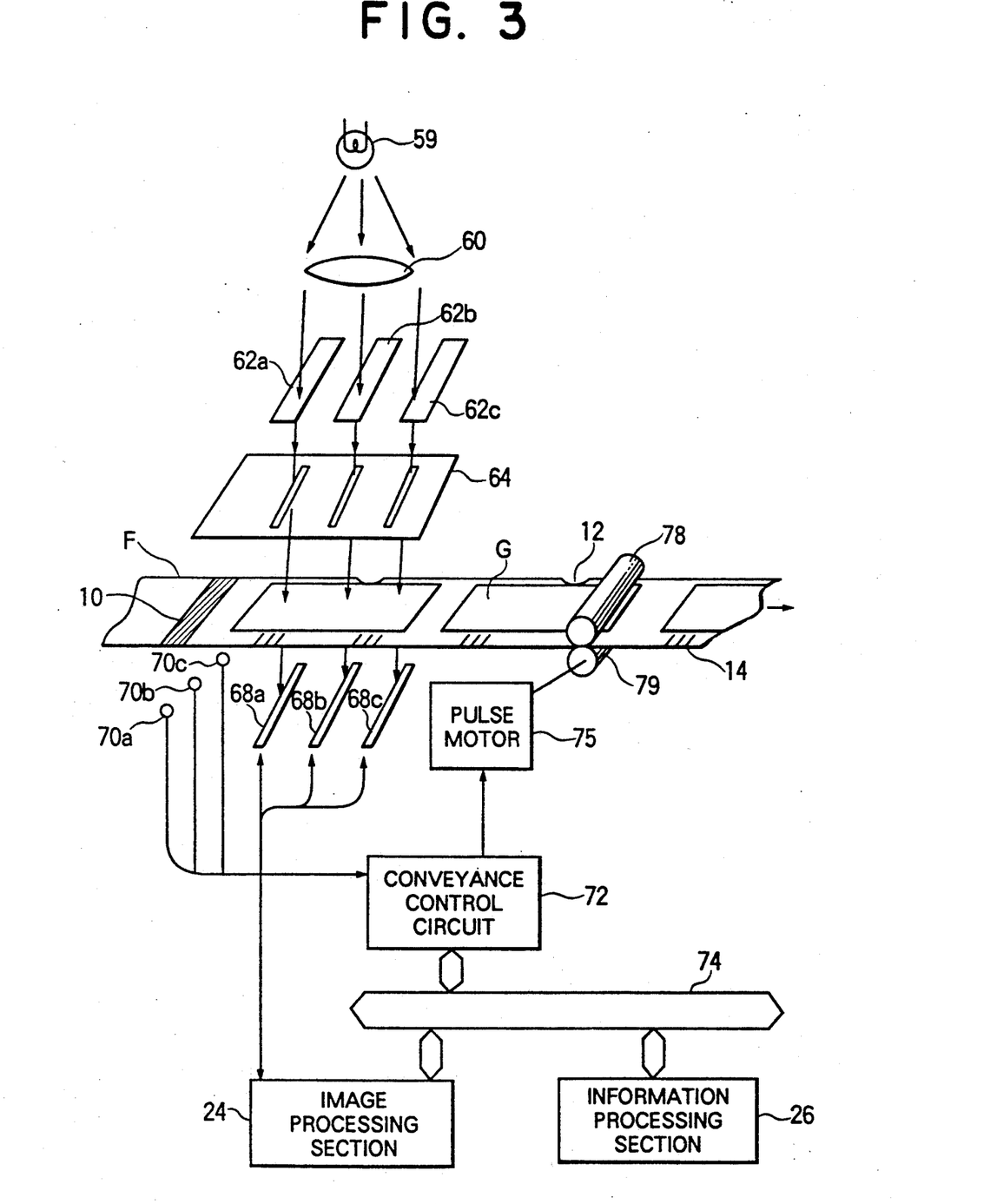
FIG. 3 is a schematic illustration showing the detail of a scanning section shown in FIG. 2.

FIG. 3 is a schematic illustration showing the detail of the structure of the scanning section 22.

In the scanning section 22, light emitted from a light source 59 is made approximately parallel by a lens 60. This parallel light is color-separated into each color of B, G and R by color separation filters 62a, 62b and 62c which are disposed in parallel with each other along the conveyance direction of photographic film F.

Photographic film F is illuminated by the light which has been color-separated and passed through slits 64. The light of B, G, R which have passed through photographic film F, are photoelectrically converted by CCD line sensors 68a, 68b, 68c which are disposed in the positions corresponding to each illumination light. Each of CCD line sensors 68a, 68b, 68c is composed of 2048 pixels. A one-dimensional image sensor which can scan over 32 mm in the width direction of photographic film F, is utilized for the CCD line sensors.

Primary scanning is performed over 32 mm in the width direction of photographic film F by the aforementioned CCD line sensors, and the image signals of B, G and R obtained here are supplied to an information processing section 24. The notch 12, splice 10 and bar code 14 are respectively detected by detectors 70a, 70b and 70c. The detected signals are sent to a conveyance control circuit 72. The conveyance control circuit 72 processes these signals, and sends the processed signals to the information processing section 24 and the information processing section 26 through a system bus 74 as a notch signal, splice signal and bar code signal.

Photographic film F is conveyed by a pulse motor 75 at a speed of 0.25 mm/pulse so that auxiliary scanning can be conducted.

Figure 4:
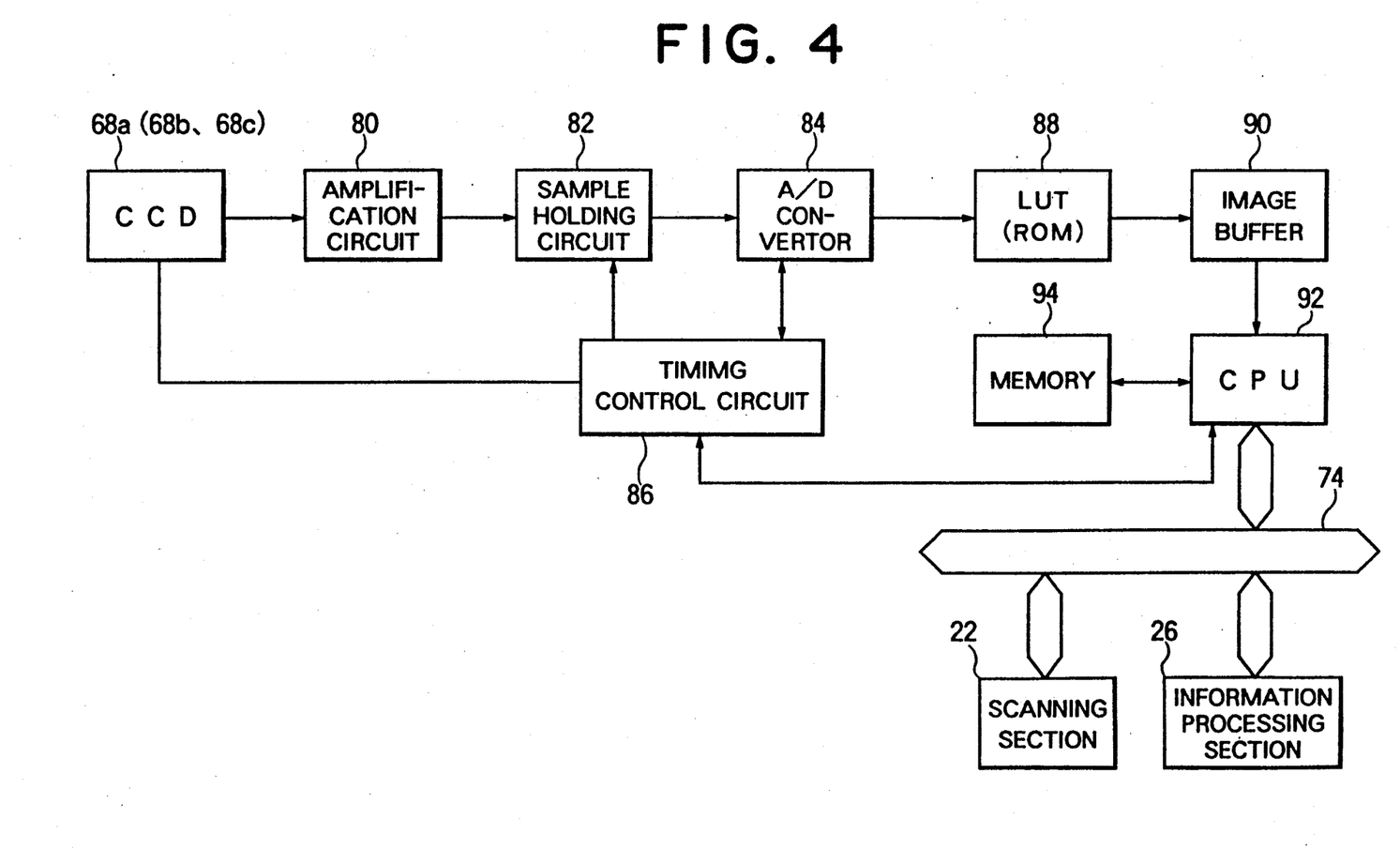
FIG. 4 is a schematic illustration showing the detail of an information processing section shown in FIGS. 2 and 3.

FIG. 4 shows the detail of structure of the information processing section 24. In the information processing section 24, signal processing is performed in the manner described as follows.

The image signal supplied by the scanning section 22, is amplified by an amplifying circuit 80. Then, the signal is sampled by a sample holding circuit 82 and an A/D converter 84 so that it is converted into a digital signal. Incidentally, a timing control circuit 86 sends drive signals for driving the CCD line sensors 68a, 68b, 68c to the scanning section 22, and at the same time, controls the sampling timing mentioned above. In this case, the number of sampling is 128 per one scanning operation, and A/D conversion is processed at 16 bits. The digitaized image signal is converted into a density signal through a look-up table (LUT) composed of ROM, and then stored in an image buffer 90. In LUT 88, a conversion table expressed by equation 1 is stored.

$$Y = a \times \log(X + b) \tag{1}$$

In the above equation, X is an input to LUT 88, and Y is an output. Character "a" is a constant relating to conversion from the photometry density determined by the spectral characteristics of an image taken in the scanning section 22, to the printing density determined by the spectral sensitivity of a photographic paper. Character "b" is a constant relating to removal of the influence of a dark current in image scanning.

In LUT 88, a plurality of conversion tables are provided which are obtained when several numerical values are substituted in equation 1 for "a" and "b", and one of the conversion tables is previously selected by CPU 92. In this case, the selected conversion tables are not necessarily the same with respect to colors B, G and R. They may be different.

In the aforementioned manner, the line image density data of 16 bits composed of 128 pixels are stored in the image buffer 90. This line image density data will be referred to as the first line image density data Da, hereinafter.

Next, internal processing (image processing) conducted inside the information processing section 24 will be explained as follows.

CPU 92 takes out the first line image density data Da synchronously with a conveyance pulse, and conducts round-off processing which is described below. After that, CPU 92 conducts image processing in the primary scanning direction to be stored in a memory 94 at each scanning.

In this case, an effective image region in the primary scanning direction (the first line image density data Da) depends on the format of photographic film F. According to the format of photographic film F, CPU92 sets an image region and the number of pixels to be round-off in the primary scanning direction. Then, CPU92 conducts round-off processing in such a manner that each pixel in the image region which has been set, is round-off with the number of pixels which has been set.

As described above, image data are processed to line image density data of a predetermined pixel number, and then the data are stored in the memory 94 at each scanning line. In this case, the predetermined pixel number is 16.

Figure 5:
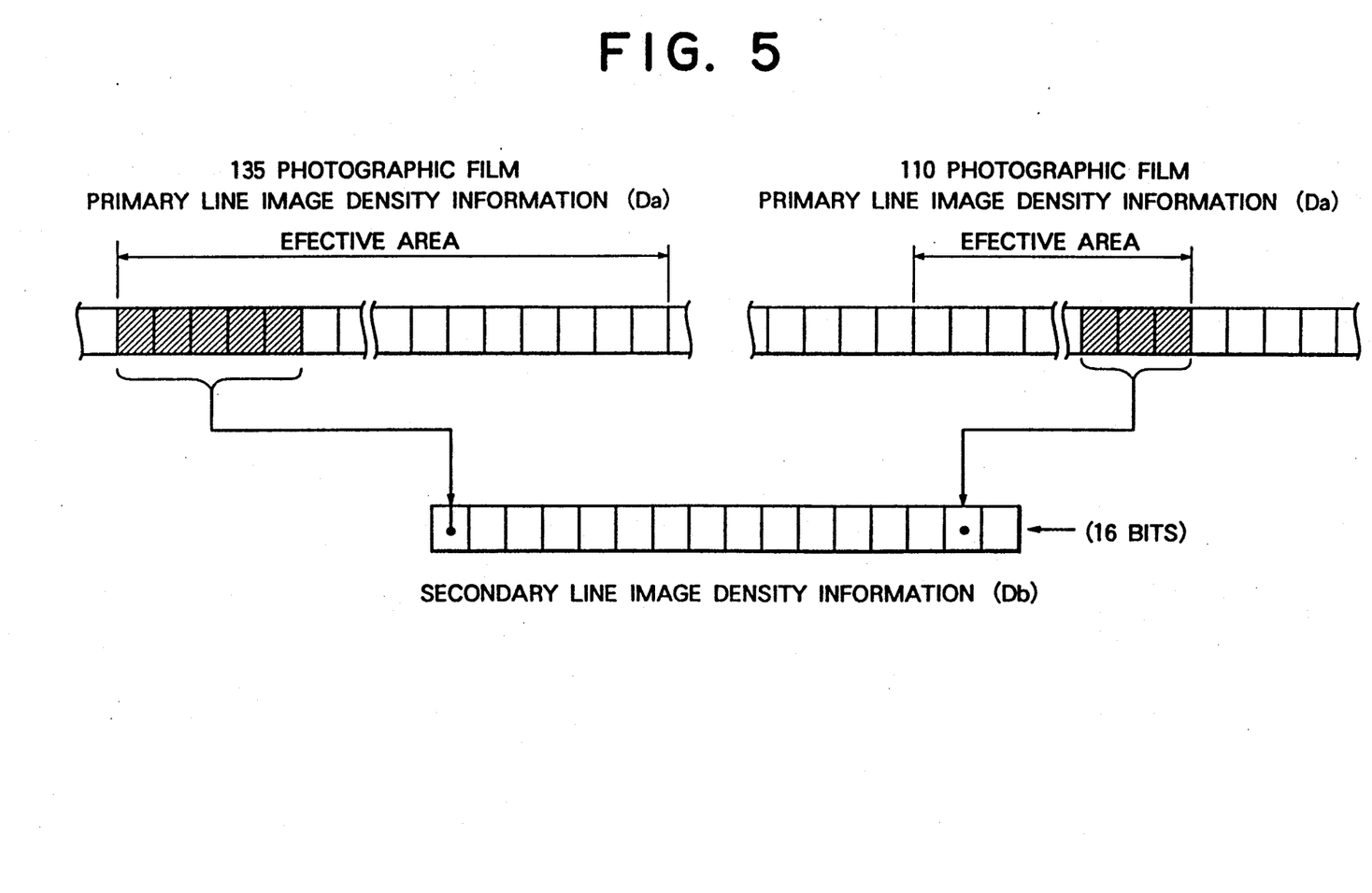
FIG. 5 is a schematic illustration showing a portion of image processing in the primary scanning direction, which is used for explanation of an example.

FIG. 5 is a schematic illustration showing an example of the aforementioned aspect. In the case of the first line image density data Da which have been obtained from a 135 photographic film, an image region corresponding to the central portion of the photographic film, the width of which is 20 mm, is set to be an effective region. Eighty pixels corresponding to the aforementioned length are divided by predetermined number 16, and the obtained numerical value 5 is set as the number of pixels to be rounded-off.

In the case of a 110 photographic film, setting is conducted as follows. In the case of the first line image density data Da which have been obtained from a 110 photographic film, an image region corresponding to the central portion of the photographic film, the width of which is 12 mm, is set to be an effective region. 48 pixels corresponding to the aforementioned length are divided by predetermined number 16, and the obtained numerical value 3 is set as the number of pixels to be rounded-off.

In this case, the round-off processing is performed in such a manner that an arithmetical means of image density data is calculated. This processing is effective to reduce the influence of noise included in the image signal. However, the round-off processing is not necessarily conducted on all pixels located within the selected image region. For example, the following methods are effective in the case where consideration is given to the calculation speed:

One is a method by which an arithmetical means is calculated while some pixels are neglected, and the other is a method by which a predetermined number of pixels are neglected without calculating an arithmetical means.

According to the aforementioned image processing in the primary scanning direction, the second line image density data Db composed of a predetermined number of pixels, in this case 16 pixels, can be obtained without relying on the format of photographic film F. This second line image density data Db is stored in the memory 94 as the line image density data corresponding to a large number of scanning lines as photographic film F is conveyed.

Further, CPU92 takes out the second line image density data Db stored in the memory 94, and the data taken out is shaped into a predetermined type of two-dimensional image density data by the image processing in the auxiliary scanning direction, and then sent to the information processing section 26.

In this case, the control of the relation between the original image formed on photographic film F and the second line image density data Db stored in the memory 94, becomes a problem. This control is conducted according to a notch signal. As described before, the notch 12 is previously aligned with the center of the original image, and detected by the scanning section 22. As a result, a notch signal corresponding to the position of the original image is sent out to CPU92 from the scanning section 22 through the system bus 74. When the notch signal is received by CPU92, it counts the number of pulses. From when the counted number has reached a predetermined processing start number, the first image density data Da stored in the image buffer 90 is taken out, and the aforementioned image processing in the primary scanning direction is repeated until the number of scanning lines reaches a predetermined numerical value.

The address of the second line image density data Db stored in the memory 94 is stored in a predetermined region of the memory 94 corresponding to the notch signal. In the aforementioned manner, the second line image density data Db is controlled correspondingly to the position of the original image formed on photographic film F. However, the aforementioned relation is concerned with the arrangement of the CCD line sensors 68a, 68b and 68c with respect to colors B, G and R. Consequently, the aforementioned predetermined counted value is selected from the previously stored constants in accordance with the color.

The aforementioned selection can be conducted by a switch (not shown) which is provided inside the information processing section 24. Due to the foregoing, each color of B, G, R can be processed by the common structure of the information processing section 24, and inner processing can be made the same. When the processing of each color is performed in parallel, the processing speed can be highly increased.

The effective image region in the auxiliary scanning direction (the number of scanning lines) differs according to the format of photographic film F. Therefore, CPU92 sets the number of scanning lines which have been previously stored in accordance with the format of photographic film F, as the aforementioned number of scanning lines. In the scanning section 22, one scanning operation is conducted per 0.25 mm. For example, the number of scanning lines corresponding to the processing region 32 mm of an original image of a 135 full-size photographing film is 128. However, that corresponding to the processing region 16 mm of an original image of a 135 half size photographing film is 64. Therefore, CPU92 sets the number of scanning lines previously stored in accordance with the format of photographic film F, as the aforementioned number of scanning lines. Further, CPU92 conducts the processing of round-off in the auxiliary scanning direction in accordance with the number of scanning lines which has been set, so that the data is processed into two-dimensional image density data composed of a predetermined number of pixels in the auxiliary scanning direction. In this case, the number of pixels in the predetermined auxiliary scanning direction is 16.

Figure 6:
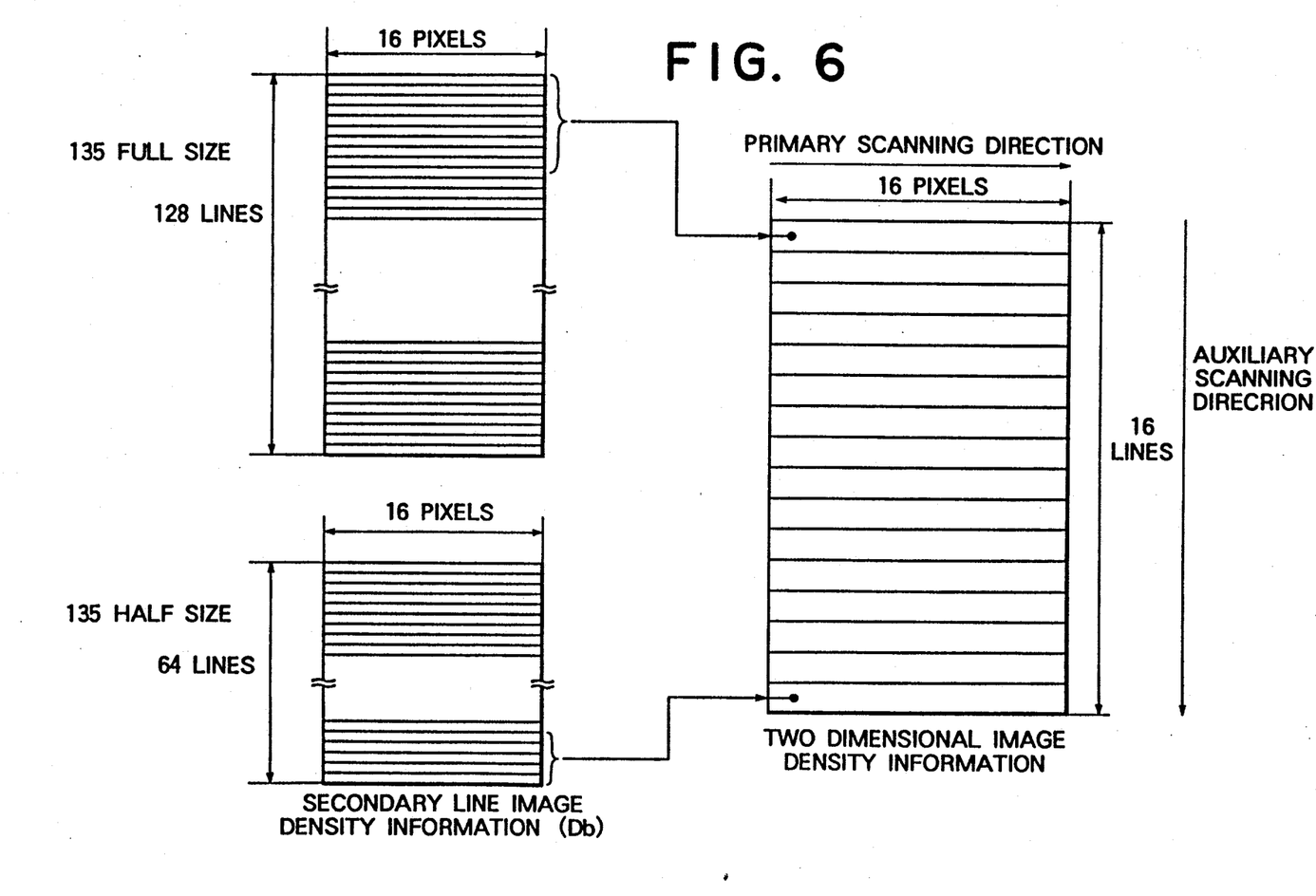
FIG. 6 is a schematic illustration showing a portion of image processing in the auxiliary scanning direction, which is used for explanation of an example.

FIG. 6 shows an example of the aforementioned aspect.

In FIG. 6, numerical value 8 which has been obtained in such a manner that the number 128 of scanning lines is divided by a predetermined number 16 of auxiliary scanning pixels, is set as the number of scanning lines of round-off with regard to the second line image density data Db obtained from a 135 full-size original image. With regard to the second line image density data Db obtained from a 135 half-size original image, numerical value 4 which has been obtained in such a manner that the number 64 of scanning lines is divided by a predetermined number 16 of auxiliary scanning pixels, is set as the number of scanning lines of round-off.

In this case, the processing of round-off is performed in such a manner that an arithmetical mean of image density data is calculated with regard to the auxiliary scanning direction, which is effective in order to reduce the influence of noise included in the image signal in the same way as the image processing in the primary scanning direction. However, the processing of round-off is not necessarily conducted on all the stored second line image density data Db. Since some of them are neglected, a method by which an arithmetical mean is not calculated, is effective in the case where consideration is given to the increase of calculation speed.

Incidentally, image processing in the primary scanning direction is not necessarily conducted on all conveyance pulses. It may be conducted intermittently. Due to the foregoing, not only the load of image processing in the primary direction but also the load of image processing in the auxiliary direction is reduced, so that the processing speed can be greatly increased. In this case, the period of intermittent processing may be changed in accordance with the format of photographic film F.

When the aforementioned image processing in the auxiliary scanning direction is conducted, the two-dimensional image density data composed of a predetermined number of pixels, in this case, 16×16 pixels, can be obtained without regard to the format of photographic film F, and this obtained data is sent to the information processing section 26. Consequently, in the information processing section 26, common processing can be conducted without regard to the format of photographic film F.

Figure 7:
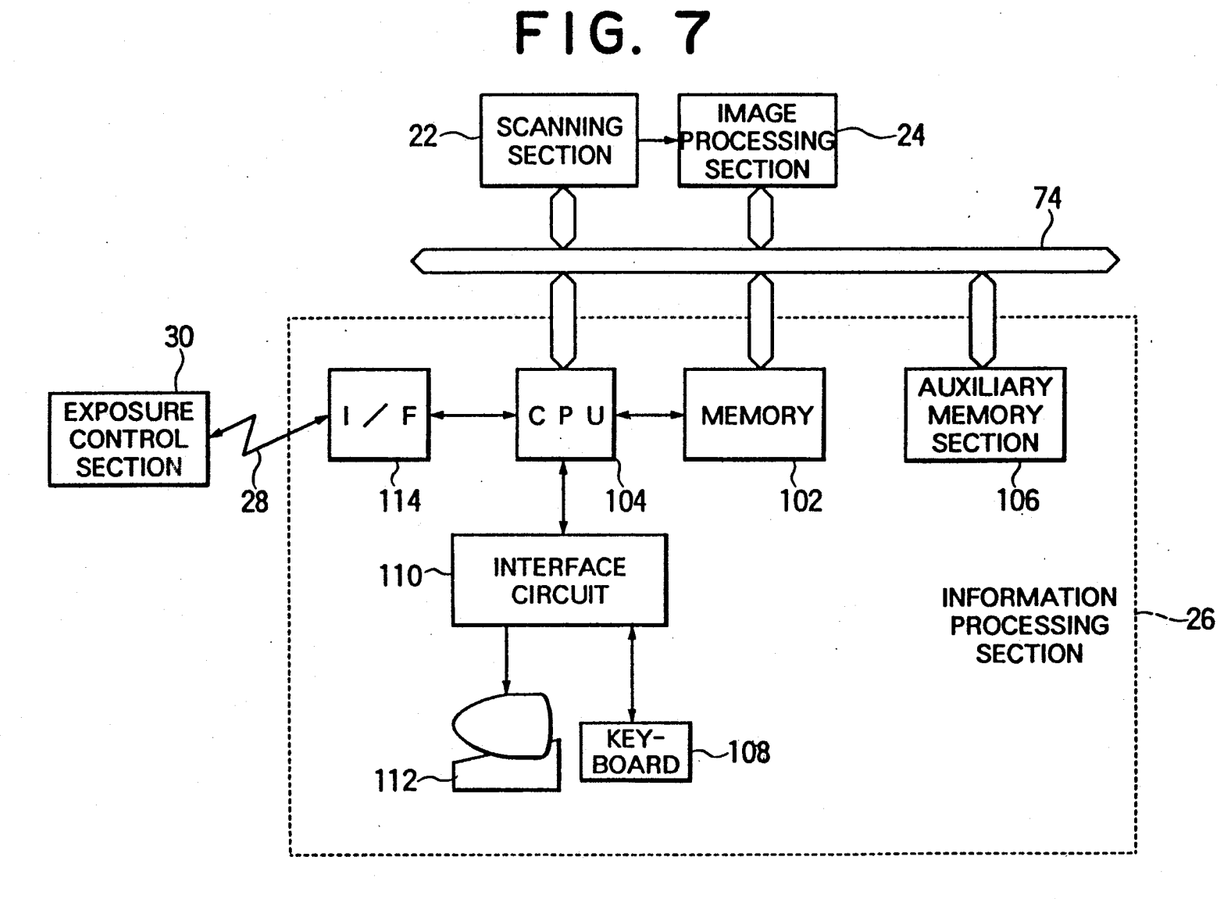
FIG. 7 is a schematic illustration showing an information processing section shown in FIGS. 2 and 3.

FIG. 7 shows the structure of the information processing section 26 in detail.

Two-dimensional image density data of colors B, G, R sent from the information processing section 24 is stored in the memory 102 through the system bus 74. CPU104 reads out the two-dimensional image density data sorted in the memory 102, and calculates the exposure correction with regard to each original image G formed on photographic film F.

This exposure correction is transmitted to the exposure control section 30 through the telecommunication circuit 28. A notch signal, splice signal and bar code signal which are sent from the conveyance control circuit 72 (Refer to FIG. 3.) of the scanning section 22 through the system bus 74, are also stored in the memory 102 and processed by CPU104.

Information to be stored and a constant necessary for processing are stored in an auxiliary memory 106. For example, the auxiliary memory 106 is made of a magnetic disk, and when necessary, recorded information can be taken out outside. Even when electric power supply is cut off, information can be preserved. Accordingly, not only the preserved information can be accumulated over a long period of time, but also the preserved information can be processed by an independent apparatus provided outside, and further, the constant can be initialized and changed.

The apparatus is provided with a display unit 112 and key board 108 which are utilized for operation, and further, input and output can be performed through an interface circuit 110.

Next, the internal processing conducted in the information processing section 26 will be explained as follows.

Figure 8:
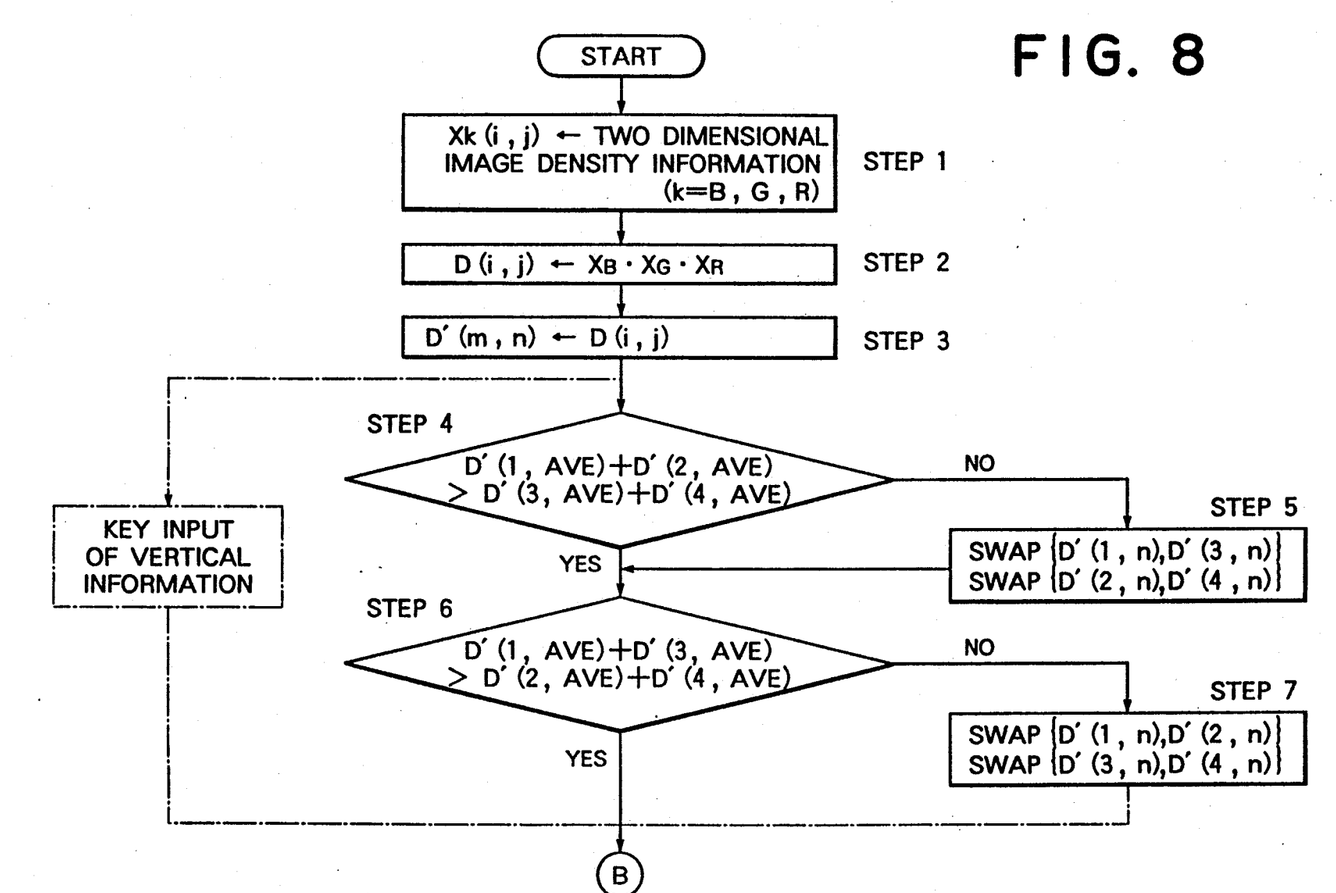
FIG. 8 is a flow chart showing inner processing performed in an information processing section.
Figure 9:
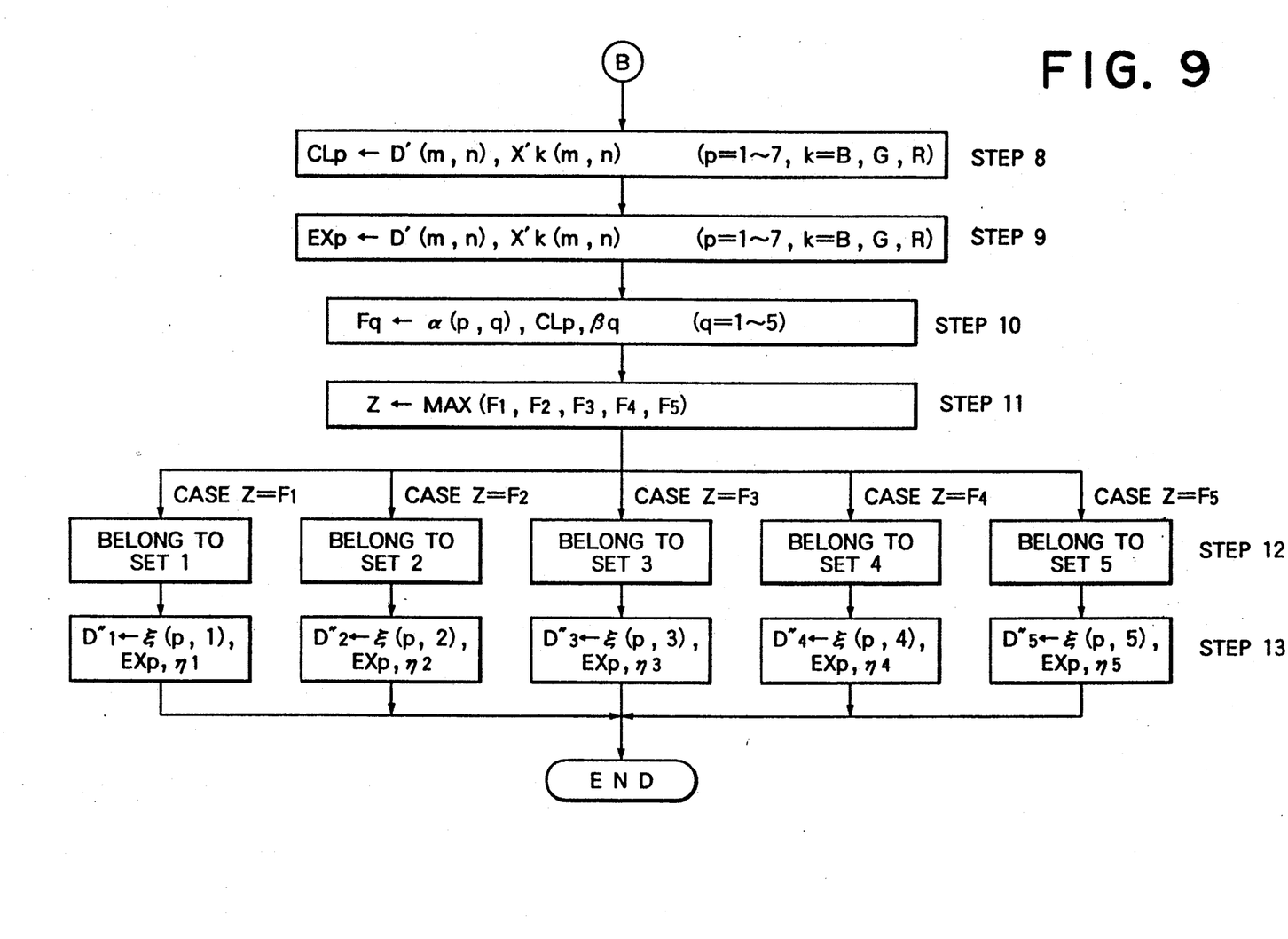
FIG. 9 is a flow chart showing inner processing performed in the information processing section, wherein the flow chart follows the one shown in FIG. 8.

FIGS. 8 and 9 are flow charts showing internal processing of CPU104 in the case where the method for determining the exposure in photographic printing according to the present invention is applied to the calculation of density exposure correction in printing.

First, in step 1, two-dimensional image density data of colors B, G, R is taken out from the memory 102, and the datum is set to variable $X_K(i, j)$. In this case, "i" represents the position of a pixel in the primary scanning direction, "j" represents the position of a pixel in the auxiliary scanning direction, and K represents each color of B, G and R.

Next, in step 2, two-dimensional image density data D(i, j) of a neutral color is calculated from two-dimensional image density data of colors B, G, R by equation 2.

$$D(i,j) = \{X_B(i,j) + X_G(i,j) + X_R(i,j)\}/3 \qquad (2)$$

In step 3, region characteristic value D'(m,n) is calculated at each divided region of original image G, using D(i,j). In this case, "m" is an identifier of the divided region. For example, identifier "m" corresponds to a left upper position, right upper position, left lower position, right lower position, center, peripheral position and the entire region. Character "n" is an identifier of the characteristic value. For example, "n" corresponds to the maximum, minimum and average value of each region.

Figure 10:
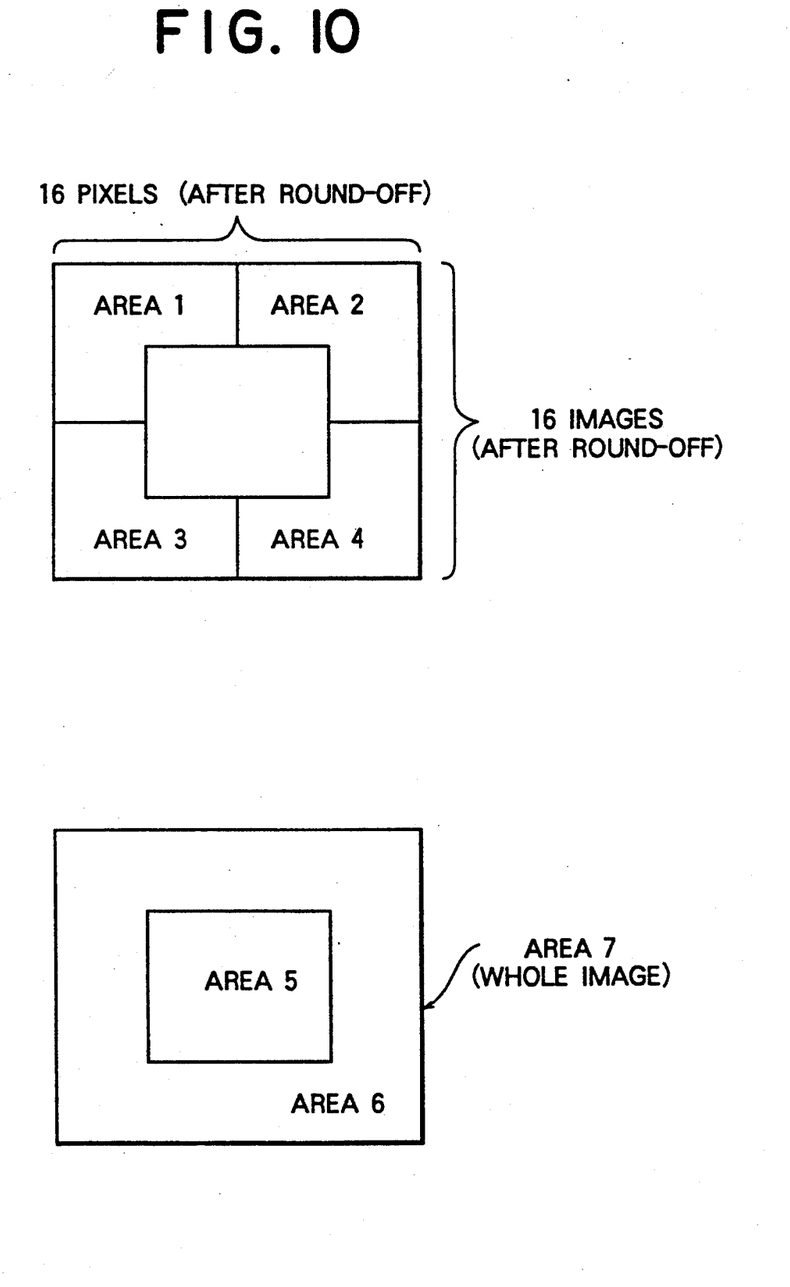
FIG. 10 is a schematic illustration showing an example of region division of two-dimensional image data used for explanation of an example.

FIG. 10 is a schematic illustration showing an example of region division of two-dimensional image density data. In the drawing, area 1 represents the left upper position, area 2 represents the right upper position, area 3 represents the left lower position, area 4 represents the right lower position, area 5 represents the center, area 6 represents the peripheral position, and area 7 corresponds to the entire screen.

For example, the region characteristic values of area 1 (the center) is expressed as follows. .
  D' (1, MAX)—Maximum density of area 1
  D' (1, MIN)—Minimum density of area 1
  D' (1, AVE)—Average density of area 1

Returning to FIG. 8, in step 4–step 7, datum of each pixel is sorted and arranged according to the two-dimensional image density data.

There are two methods for sorting and arranging the datum of each pixel.

One method is described as follows:

According to the obtained two-dimensional image data, the total or average of the characteristic values in the direction of a line or row, is found. In accordance with the result of the aforementioned calculation, all pixel values of the line or row are rearranged in order of increasing power.

The other method is described as follows:

The divided region is rearranged according to the region characteristic value of each divided region, for example, according to the average density value in the region. Either of them may be adopted. In this specification, an example will be explained in which the latter is adopted.

In step 4, the average density value (that is the average density value of the upper portion of the screen) of area 1 and area 2, and the average density value (that is the average density value of the lower portion of the screen) of area 3 and area 4, are compared with each other. When the average density of areas 1 and 2 is higher than that of areas 3 and 4 (that is "Yes" in the drawing), the process advances to step 6 as it is.

When the average density of areas 3 and 4 is higher (that is, "No" in the drawing), the process proceeds to the arrangement shown in step 5. Function SWAP{a,b} shown in step 5 is to exchange values "a" and "b". In this case, the function exchanges the region characteristic value of area 1 for the characteristic value of area 3. After the arrangement of the values, the process proceeds to step 6.

Next, in step 6, the average density value (that is the average density value of the left portion of the screen) of area 1 and area 3, and the average density value (that is the average density value of the right portion of the screen) of area 2 and area 4, are compared with each other. When the average density of areas 1 and 3 is higher than that of areas 2 and 4 (that is "Yes" in the drawing), the process advances to step 8 as it is. (Refer to FIG. 9.)

On the contrary, when the average density of area 2 and area 4 is higher (that is, "No" in the drawing), the process proceeds to the sorting and arranging operation conducted in step 7. The region characteristic value of area 1 is replaced with that of area 2, using function SWAP, and the characteristic value of area 3 is replaced with that of area 4. After the sorting and arranging operation has been completed, the process proceeds to step 8.

When the arrangement operations are conducted in step 4–step 7 in the manner described above, two-dimensional image data as image structure is lost. However, density data can be uniformly treated irrespective of the state of the original image, that is the original image is normal or inverse, and irrespective of camera angle.

In the case where the state of the original image, that is the original image is normal or inverse, is previously known, or an operator inputs the state of the original image through a key board 108, step 4–step 7 may be skipped and the arrangement operation may be conducted according to the previously given information.

In steps 8 and 9, image characteristic value for classification $CL_p$ and image characteristic value for exposure calculation $EX_p$ are calculated, using region characteristic value $D'(m,n)$ which is determined at each division region of original image G. $CL_p$ and $EX_p$ are calculated with the function of the aforementioned region characteristic value $D'(m,n)$. Otherwise, the aforementioned region characteristic value $D'(m,n)$ may be used as it is. Region characteristic value $D'(m,n)$ is calculated, using two-dimensional image density data $D(i,j)$ of a neutral color which has been obtained with equation 2. However, the aforementioned image characteristic value for classification $CL_p$ and image characteristic value for exposure calculation $EX_p$ may be calculated with the function of region characteristic value $X'_B(m,n)$, $X'_G(m,n)$, or $X'_R(m,n)$ which has been obtained from two-dimensional image density data $X_B(i,j)$, $X_G(i,j)$, or $X_R(i,j)$ relating to each color of B, G and R.

In this example, $CL_p$ and $EX_p$ are respectively composed of 7 characteristic values, and further $CL_p = EX_p$. The type of function and the number of each characteristic value are not limited to the specific example. In general, the relation between $CL_p$ and $EX_p$ may be $CL_p \neq EX_p$.

In this case, 7 characteristic values shown in equation 3 have been selected for the purpose of statistically analyzing populations of a large number of original images, and further for the purpose of appropriately sorting the populations into a plurality of predetermined sets which will be described later.

$$CL_1 = 100 \times D'(7,MAX) + D'(7,MIN) - 2 \times D'(7,AVE)\}/\{D'(7,MAX) - D'(7,MIN)\}$$

$$CL_2 = D'(5,AVE) - D'(7,AVE)$$

$$CL_3 = X'_B(7,AVE) - X'_G(7,AVE)$$

$$CL_4 = \{D'(3,MAX) + D'(4,MAX) + D'(5,MAX)\}/3 - D'(7,AVE)$$

$$CL_5 = \{D'(1,AVE) + D'(2,AVE)\}/2$$

$$CL_6 = X'_R(7,AVE) - X'_G(7,AVE)$$

$$CL_7 = \{D'(3,AVE) + D'(4,AVE) + D'(5,AVE)\}/3 - D'(7,AVE)$$

$$EX_1 = CL_1$$

$$EX_2 = CL_2$$

$$EX_3 = CL_3$$

$$EX_4 = CL_4$$

$$EX_5 = CL_5$$

$$EX_6 = CL_6$$

$$EX_7 = CL_7 \qquad (3)$$

Next, in step 10, a linear first order sum according to equation 4 is calculated, using image characteristic value for classfication $CL_p$ and factors which are stored correspondingly to a plurality of predetermined sets.

$$F_q = \sum_p a\,(p,q) \times CL_p + \beta_q \qquad \text{[EQUATION 4]}$$

(In the case of equation 3, p=1–7.)

In this case, q is an identifier for a predetermined set. In order to obtain a photographic print of an appropriate exposure from an original image, the sets are determined, for example, according to the degree of exposure correction to the exposure calculated at LATD, as follows.

Set 1: Set 1 is a set composed of original images which require an extreme negative correction.

Set 2: Set 2 is a set composed of original images which require a slight negative correction.

Set 3: Set 3 is a set composed of original images which do not require a correction.

Set 4: Set 4 is a set composed of original images which require a slight positive correction.

Set 5: Set 5 is a set composed of original images which require an extreme positive correction.

Values of $\alpha(p, q)$ and $\beta_q$ are stored in accordance with set q of original image, and can be found from a population composed of a large number of original images by a statistic method. In this example, an image set is determined according to the degree of exposure. However, it is possible to determine the set in accordance with the scene of an original image such as a strobe light scene, rear-light scene and snow scene.

Next, in steps 11 and 12, a set to which original image G belongs, is determined when $F_q$ calculated for each image set in step 10 is evaluated. For example, the aforementioned $F_1$-$F_5$ are compared, and it is determined that original image G belongs to a set, the value of which is the largest.

In step 13, density correction value $D''_q$ is found by the regression equation shown in the following equation 5, wherein density correction value $D''_q$ is a value obtained when it is judged with image characteristic value for exposure calculation EXp that each original image belongs to set q.

$$D'_q = \sum_p \xi\,(p,q) \times EX_p + \eta_q \qquad \text{[EQUATION 5]}$$

(In the example of equation 3, p=1-7.) where $\xi(p, q)$ is a factor which has been previously determined from the population of original images at each image set by a statistic method, and $\eta_q$ is a constant.

On the other hand, color correction value $C''_{KL}$ can be found by a method disclosed in the official gazette of Japanese Patent Application Open to Public Inspection No. 6939/1990, in which a color exposure correction is determined in accordance with a cumulative distribution function (CDF) of each of the colors B, G and R of an original image and a neutral color.

Density correction value $D''_q$ and color correction value $C''_{KL}$ obtained in the aforementioned manner are transmitted to the exposure control section 30 through the telecommunication line 28 so that the exposure can be determined.

Next, determination of an exposure in the exposure control section 30 will be explained as follows. The exposure is determined according to equation 6.

$$E_K = LATD_K - LATD0_K + \mu \times C'_{KL} + \nu_q \times D'_q + E0_K \qquad (6)$$

where $E_K$ is an exposure (logarithmic of exposure time) of each of colors B, G and R, $LATD_K$ is an average transmitted light photometric value (logarithmic) of an original image to be printed wherein the light is sent from the photodiodes 44a, 44b and 44c, $LATD0_K$ is an average transmitted light photometric value (logarithmic) of a reference original image, $C''_{KL}$ is a color correction value sent from the information processing section 26, $\mu$ is a coefficient to be used for adjusting the color correction, $D''_q$ is a density correction value sent from the information processing section 26, $\nu_q$ is a coefficient for adjusting the density correction, $EO_K$ is an exposure (logarithmic of exposure time) which has been set for a reference original image, and K represents each of colors B, G and R. Consequently, an exposure is found in accordance with the average transmitted light photometric value of an original image, and corrected with a density and a color correction value.

In the aforementioned case, average transmitted light photometric value $LATD_K$ has been utilized. Instead of average transmitted light photometric value $LATD_K$, the average value of image density may be used.

Concerning $\nu_q$, it is possible to vary the degree of the density correction in accordance with image set q. That is, in the case of the aforementioned image classification, 5 kinds of image sets are provided in accordance with the degree of density correction in order to obtain a print of appropriate exposure. However, when the degree of correction of set 5 (Set 5 is a set composed of original images which require an extreme positive correction.) is to be intensified, a higher value may be set at $\nu 5$. (Usually, the value of $\nu 5$ is 1.)

Due to the foregoing, even when the tendency of scene distribution varies according to the season or the photographic characteristics of a negative film and photographic paper are changed, adjustment can be performed so that the finished quality can be the best. Further, in each laboratory, setting can be changed individually. Due to the foregoing, consideration can be given to the difference of scene distribution.

In the aforementioned example, a case has been explained in which the method for determining an exposure of the present invention is applied to the calculation of the density exposure correction. However, when the present invention is applied to the color correction calculation, it is possible to calculate a color exposure correction for the original image in such a manner that: a set classified according to predetermined class, for example, a color failure set or an artificial light set, is set; the linear first order sums of the image characteristic values are calculated; and according to the result of calculation step, an image set to which the original image belongs, is judged.

As explained above, according to the method for determining an exposure of the present invention, operations are performed in this manner: an original image on a photographic film is scanned to obtain image data; the region characteristic values in each of plural areas of an image are obtained; image characteristic values of the original image is calculated from the obtained region characteristic values; the linear first order sums of the image characteristic values are calculated; and according to the result of the calculation, a set of a plurality of predetermined sets to which the original image belongs, is judged. Due to the method described above, an overall evaluation is conducted, utilizing a plurality of image characteristic values, so that an appropriate image classification can be realized without being affected by the photographic exposure, and the photographing condition of the original image. Therefore, the similar scenes are positively classified into the same image set, so that the printing quality can be stabilized and the continuity of prints with regard to a similar scene can be improved.

Even when an image characteristic value is affected by a noise when an original image is scanned, the influence can be reduced because an overall evaluation is conducted, utilizing a plurality of image characteristic values. Consequently, image classification can be improved, and as a result, the reproducibility and stability of exposure calculation can be improved.

When a linear first order sum is calculated, an original image can be classified into an image set. Accordingly, as compared with conventional technique in which the similarity between a plurality of frames is introduced, the method of the present invention can find an exposure quickly and accurately when a very small amount of calculation is effected.

Further, it is possible to conduct a fine adjustment on an exposure or exposure correction which has been calculated in accordance with a classified image set. Therefore, it is possible to provide a highly practical method for determining an exposure by which appropriate photographic prints can be obtained in accordance with the change of season distribution or the change of the photographic characteristics of photosensitive materials.

According to the present invention, photographic prints of high quality can be stably produced, so that the method of the present invention is very effective to rationalize the photographic printing process and to improve the efficiency so that the cost can be reduced.

What is claimed is:

1. A method for determining an exposure for printing an original image of a photographic film on to a photographic paper, comprising the steps of:
    scanning an image on a photographic film to obtain an image data;
    obtaining a plurality of region characteristic values from said image data;
    obtaining a plurality of image characteristic values from said region characteristic values;
    calculating a linear first order sum of said image characteristic values; and
    selecting one of a plurality of predetermined sets of original images according to the result of said calculating step;
wherein said exposure is determined with a regression equation predetermined for one of said predetermined sets of original images.

2. The method of claim 1, wherein said region characteristic values include a maximum density value, a minimum density value, and an average density value in each of a plurality of areas of said image data.

3. The method of claim 1, wherein said image characteristic values are selected from at least one of functions of region characteristic values and said region characteristic values themselves.

* * * * *